United States Patent
Bertsch et al.

(10) Patent No.: US 10,632,551 B2
(45) Date of Patent: *Apr. 28, 2020

(54) ADJUSTABLE SHOE FOR A POWER TOOL (71) Applicant: MILWAUKEE ELECTRIC TOOL CORPORATION, Brookfield, WI (US)

(72) Inventors: Matthew T. Bertsch, New Berlin, WI (US); Steven F. Thiel, Colgate, WI (US); William A. Elger, West Bend, WI (US); Melissa M. Marineau, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,319

(22) Filed: Jan. 15, 2019

(65) Prior Publication Data

US 2019/0143428 A1 May 16, 2019

Related U.S. Application Data

(63) Continuation of application No. 14/046,411, filed on Oct. 4, 2013, now Pat. No. 10,183,349, which is a
(Continued)

(51) Int. Cl.
  *B27B 13/00* (2006.01)
  *B23D 53/12* (2006.01)
  *B23D 55/00* (2006.01)

(52) U.S. Cl.
  CPC ............ *B23D 53/12* (2013.01); *B23D 55/00* (2013.01)

(58) Field of Classification Search
  CPC .................... B23D 53/12; B23D 55/00–55/10
  See application file for complete search history.

(56) References Cited

U.S. PATENT DOCUMENTS

| 1,482,954 A | 2/1924 | Tideman |
| 1,530,682 A | 3/1925 | Lyman |

(Continued)

FOREIGN PATENT DOCUMENTS

| JP | 2001300819 | 10/2001 |
| JP | 2004345041 | 12/2004 |

OTHER PUBLICATIONS

Milwaukee Deep Cut Saw Model 6230N, Operator's Manual, known at least as early as Sep. 15, 2009, 13 pgs.
(Continued)

*Primary Examiner* — Stephen Choi
(74) *Attorney, Agent, or Firm* — Michael Best & Friedrich LLP (57) ABSTRACT

A shoe for a band saw, the shoe having a body including a generally C-shaped member defined by a substantially planar portion for engaging a workpiece and a pair of rails extending transversely therefrom and wrapping such that the body includes a generally T-shaped receptacle for slidably receiving a correspondingly-shaped member. The substantially planar portion includes apertures aligned linearly. A biased detent feature has a holding force with a magnitude sufficient to hold the body when the detent feature is seated in one of the apertures. The body is moveable linearly, relative to the detent feature, in the direction of alignment of the apertures between engaged and non-engaged positions. The body is moveable out of the engaged position in the direction by application of a disengaging force in the direction acting to move the body with respect to the detent feature and acting to overcome the holding force in the engaged position.

20 Claims, 9 Drawing Sheets

Related U.S. Application Data continuation of application No. 12/794,023, filed on Jun. 4, 2010, now Pat. No. 8,549,760, which is a continuation-in-part of application No. 12/508,824, filed on Jul. 24, 2009, now Pat. No. 8,549,759.

(60) Provisional application No. 61/083,703, filed on Jul. 25, 2008.

(56) References Cited

U.S. PATENT DOCUMENTS

| | | | |
|---|---|---|---|
| 2,591,999 | A | 4/1952 | Barham, Sr. |
| 2,596,081 | A | 5/1952 | Sacrey |
| 2,800,933 | A | 7/1957 | Michael |
| 2,916,062 | A | 12/1959 | Clauson |
| 3,309,050 | A | 3/1967 | Blink et al. |
| 3,462,171 | A | 8/1969 | Mitty et al. |
| 3,553,802 | A | 1/1971 | Stanley |
| 3,825,355 | A | 7/1974 | Martin |
| 4,001,937 | A | 1/1977 | Stelljes et al. |
| 4,012,158 | A | 3/1977 | Harper |
| 4,023,572 | A | 5/1977 | Weigand et al. |
| 4,036,525 | A | 7/1977 | Howk |
| 4,126,340 | A | 11/1978 | Pelcin |
| 4,320,680 | A | 3/1982 | de la Cruz et al. |
| 5,720,096 | A | 2/1998 | Doersey |
| 5,727,322 | A | 3/1998 | Giacometti |
| 5,755,148 | A | 5/1998 | Stumpf et al. |
| 5,779,724 | A | 7/1998 | Werner |
| 5,943,931 | A | 8/1999 | Stumpf et al. |
| 5,957,022 | A | 9/1999 | Stumpf et al. |
| 6,202,311 | B1 | 3/2001 | Nickels, Jr. |
| 6,418,830 | B1 | 7/2002 | Stumpf et al. |
| 6,425,309 | B1 | 7/2002 | Stumpf et al. |
| 6,671,969 | B2 | 1/2004 | Phillips et al. |
| 6,829,830 | B2 | 12/2004 | O'Banion |
| RE40,349 | E | 6/2008 | Blum et al. |
| 7,395,603 | B2 | 7/2008 | Sugiura et al. |
| 7,424,779 | B2 | 9/2008 | Tozawa et al. |
| 7,426,786 | B2 | 9/2008 | Beville et al. |
| 7,430,807 | B2 * | 10/2008 | Saegesser ............ B23D 49/167 30/122 |
| 7,434,502 | B2 | 10/2008 | Keeton et al. |
| 7,437,824 | B2 | 10/2008 | Chreene et al. |
| 7,441,487 | B2 | 10/2008 | Liu et al. |
| 7,497,017 | B2 | 3/2009 | Bone et al. |
| D627,203 | S | 11/2010 | Serdynski et al. |
| 7,926,187 | B2 | 4/2011 | Uehlein-Proctor et al. |
| 8,549,759 | B2 | 10/2013 | Bertsch et al. |
| 8,549,760 | B2 | 10/2013 | Bertsch et al. |
| 8,640,346 | B2 | 2/2014 | Allen et al. |
| 10,183,349 | B2 | 1/2019 | Bertsch et al. |
| 2001/0001375 | A1 | 5/2001 | Meredith et al. |
| 2004/0020061 | A1 | 2/2004 | O'Banion |
| 2004/0158996 | A1 | 8/2004 | McIntosh |
| 2005/0000338 | A1 | 1/2005 | Wascow |
| 2005/0093359 | A1 | 5/2005 | Hobb et al. |
| 2005/0183271 | A1 | 8/2005 | Sugiura et al. |
| 2005/0283984 | A1 | 12/2005 | Walmsley |
| 2006/0288591 | A1 | 12/2006 | Chreene et al. |
| 2007/0000137 | A1 | 1/2007 | Beville et al. |
| 2008/0047150 | A1 | 2/2008 | Phillips et al. |
| 2008/0148915 | A1 | 6/2008 | Nickels et al. |
| 2008/0172891 | A1 | 7/2008 | Nie |
| 2008/0224514 | A1 | 9/2008 | Zink et al. |
| 2008/0235961 | A1 | 10/2008 | Chreene et al. |
| 2009/0025520 | A1 | 1/2009 | Heinrichs |
| 2009/0071017 | A1 | 3/2009 | Gehret |
| 2009/0113727 | A1 | 5/2009 | Chen |
| 2009/0205211 | A1 | 8/2009 | Nickels, Jr. et al. |
| 2009/0241353 | A1 | 10/2009 | Ericson et al. |
| 2009/0265943 | A1 | 10/2009 | Miller et al. |
| 2009/0277315 | A1 | 11/2009 | Ipatenco et al. |
| 2009/0301278 | A1 | 12/2009 | Agan et al. |
| 2011/0083330 | A1 | 4/2011 | Steele et al. |

OTHER PUBLICATIONS

Milwaukee Deep Cut Saw Model 6230N, Service Parts List, Nov. 2011, 2 pgs.

Milwaukee Cordless Band Saw Model 0729-20, Service Parts List, Feb. 2009, 2 pgs.

Milwaukee Cordless Band Saw Model 0729-20, Operator's Manual, Jul. 2008, 28 pgs.

Makita 2107F Portable Band Saw, Instruction Manual, known at least as early as Sep. 15, 2009, 24 pgs.

Makita 2107F Portable Band Saw, Parts Breakdown, known at least as early as Sep. 15, 2009, 4 pgs.

\* cited by examiner

ADJUSTABLE SHOE FOR A POWER TOOL

RELATED APPLICATIONS

This application is a continuation of U.S. patent application Ser. No. 14/046,411 filed on Oct. 4, 2013, now U.S. Pat. No. 10,183,349. U.S. patent application Ser. No. 14/046,411 is a continuation of U.S. patent application Ser. No. 12/508,824 filed on Jul. 24, 2009, now U.S. Pat. No. 8,549,759, which claims priority to U.S. Provisional Patent Application Ser. No. 61/083,703 filed on Jul. 25, 2008. U.S. patent application Ser. No. 14/046,411 is also a continuation of U.S. patent application Ser. No. 12/794,023 filed on Jun. 4, 2010, now U.S. Pat. No. 8,549,760, which is a continuation-in-part of U.S. patent application Ser. No. 12/508,824 filed on Jul. 24, 2009, now U.S. Pat. No. 8,549,759, which claims priority to U.S. Provisional Patent Application Ser. No. 61/083,703 filed on Jul. 25, 2008. The entire contents of all of which are incorporated herein by reference.

BACKGROUND

The present invention relates to workpiece locators for power tools, and more particularly for band saws.

A band saw typically includes a drive wheel pulley, a motor coupled to the drive wheel pulley to drive the drive wheel pulley, a driven wheel pulley, and a continuous band saw blade looped around the drive wheel and the driven wheel. Band saws may also include a shoe to locate a workpiece with respect to a cutting portion of the band saw blade. The workpiece may be large or small and take on many various shapes. To remove the shoe or adjust a position of the shoe depending on the workpiece or type of cut to be made, a user uses a tool to release the shoe from a first position and secure it in a second position.

SUMMARY

In one aspect, the invention provides a shoe for a band saw. The shoe includes a body having a substantially planar surface for engaging a workpiece, and a plurality of apertures aligned linearly along the substantially planar surface. The body defines a generally C-shaped member having a generally C-shaped cross-section in a plane substantially perpendicular to the substantially planar surface, the generally C-shaped member defining in the plane a generally T-shaped receptacle for slidably receiving a correspondingly-shaped member. The shoe also includes a biased detent feature having a holding force with a magnitude sufficient to hold the body when the detent feature is seated in one of the plurality of apertures. The generally C-shaped member includes a pair of rails extending substantially parallel to a direction of alignment of the plurality of apertures for constraining the movability of the body to a linear path. The body is moveable linearly in the direction of alignment of the plurality of apertures between an engaged position in which the body is held with the holding force of the detent feature, and a non-engaged position in which the body is movable with respect to the detent feature. The body is moveable out of the engaged position in the direction by application of a disengaging force in the direction acting to move the body with respect to the detent feature and acting to overcome the holding force in the engaged position.

In another aspect, the invention provides a shoe for a band saw. The shoe includes a body having a generally C-shaped member defined by a substantially planar portion for engaging a workpiece and a pair of rails extending transverse to the substantially planar portion and wrapping such that the body includes a generally T-shaped receptacle defined by the substantially planar portion and the pair of rails for slidably receiving a correspondingly-shaped member. The substantially planar portion includes a plurality of apertures aligned linearly. The shoe also includes a biased detent feature having a holding force with a magnitude sufficient to hold the body when the detent feature is seated in one of the plurality of apertures. The body is moveable linearly, relative to the detent feature, in the direction of alignment of the plurality of apertures between an engaged position in which the body is held with the holding force of the detent feature, and a non-engaged position in which the body is movable with respect to the detent feature. The body is moveable out of the engaged position in the direction by application of a disengaging force in the direction acting to move the body with respect to the detent feature and acting to overcome the holding force in the engaged position.

In yet another aspect, the invention provides a shoe kit for a band saw. The shoe kit includes a body having a generally C-shaped member defined by a substantially planar portion for engaging a workpiece and a pair of rails extending transverse to the substantially planar portion and wrapping such that the body includes a generally T-shaped receptacle defined by the substantially planar portion and the pair of rails of the generally C-shaped member. The substantially planar portion includes at least one aperture. The shoe kit also includes a block configured to be coupled to the band saw, the block defining a generally T-shaped member correspondingly shaped with the generally T-shaped receptacle. The body is configured to slide relative to the generally T-shaped member in a linear direction. The shoe kit also includes a biased detent feature having a holding force with a magnitude sufficient to hold the body relative to the block when the detent feature is seated in the at least one aperture. The body is slideable in the linear direction with respect to the generally T-shaped member between an engaged position in which the body is held relative to the block with the holding force of the detent feature, and a non-engaged position in which the body is movable with respect to the block.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

DETAILED DESCRIPTION

FIGS. 1-7 illustrate a band saw 10 and an adjustable shoe system 91 embodying some aspects of the invention. An AC version of the band saw 10 having an electrical connection cord 12 is illustrated; however, in further embodiments, DC versions of the band saw 10 including a rechargeable, removable battery pack are possible.

Figure 1:
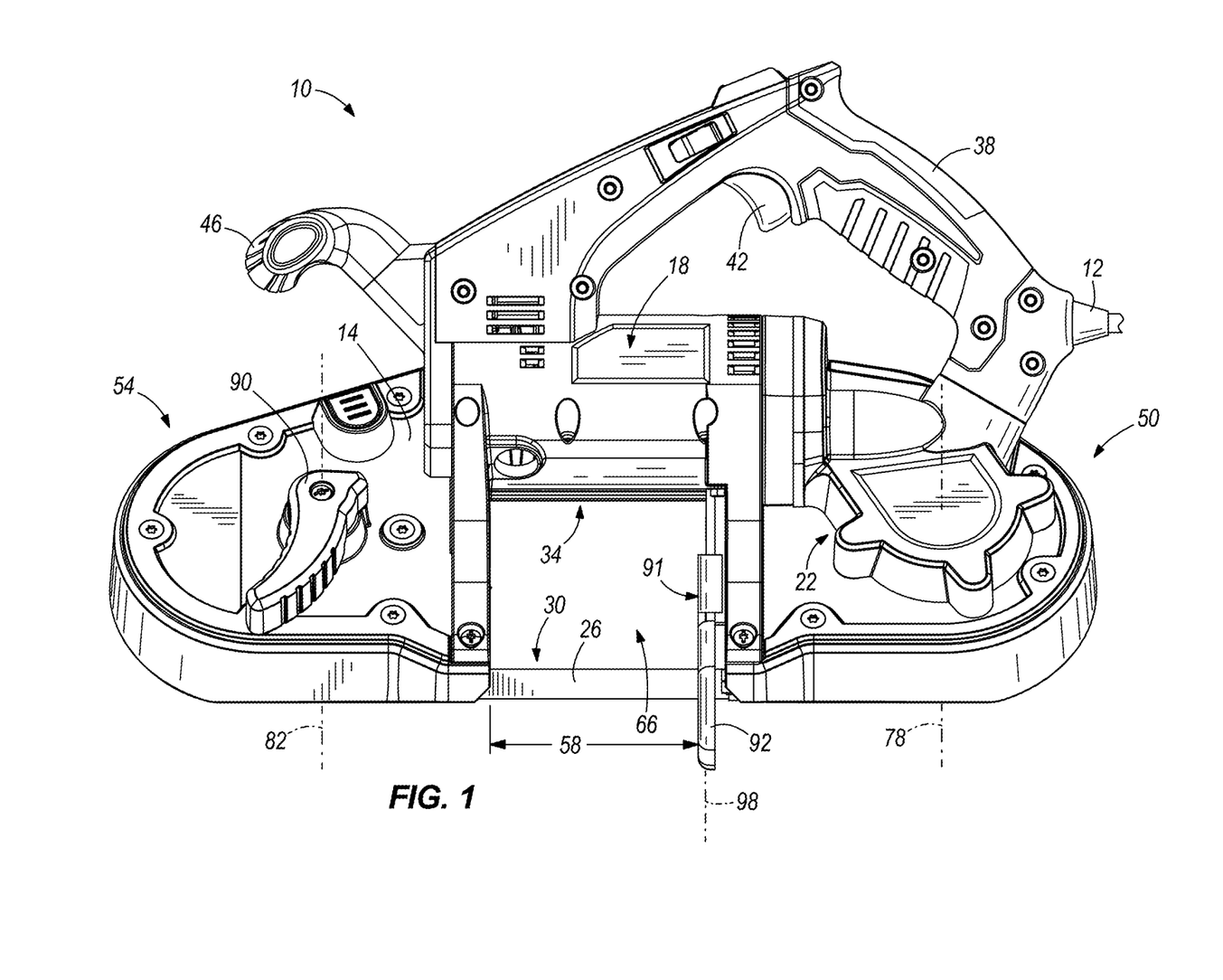
FIG. 1 is a side perspective view of a band saw including an adjustable shoe system according to one embodiment of the invention.

The band saw 10 includes a housing or frame 14 supporting a motor 18 and a gear box 22. The motor 18 is drivingly connected to a drive mechanism (not shown) at least partially housed within the gear box 22. The motor 18 and the drive mechanism are operable to drive a continuous band saw blade 26 to cut a workpiece. As described herein, the band saw 10 includes a front 30 and a rear 34. The front 30 is defined as the side being proximate the portion of the band saw blade 26 that cuts the workpiece and the rear 34 is defined as the side proximate the portion of the band saw blade 26 that does not cut the workpiece. The rear 34 is otherwise described as being opposite the front 30.

The housing 14 includes a main handle 38 supporting a switch assembly 42 to provide power to the band saw 10. The switch assembly 42 is operable to control operation of the motor 18. The band saw 10 also includes an auxiliary handle 46 for a user's other hand spaced from the main handle 38. Generally, the handles 38, 46 are shaped and arranged for two-handed operation of the band saw 10 as the workpiece is cut. In the illustrated construction, each handle 38, 46 has an ergonomic design to provide comfortable gripping and controlled operation of the band saw. The ergonomic design of each handle and of the combination of the handles may include the orientation or angle of handle(s). The ergonomic design may also include the use of material, such as an elastomeric material, on the handle(s) to, one or more of, provide an improved grip surface, isolate vibration and impacts from the operator, prevent heat build-up and/or transfer to the operator, etc.

The housing 14 defines a first portion 50 and a second portion 54. The first portion 50 and the second portion 54 are spaced apart from one another and define a U-shaped cavity 66 defining a cut zone 58 therebetween. A blade guard 62 (FIG. 2A) is positioned at the rear 34 of the band saw 10 and extends between the first and second portions 50, 54 within the cut zone 58. The blade guard 62 provides a recessed area to house the band saw blade 26.

Figure 2A:
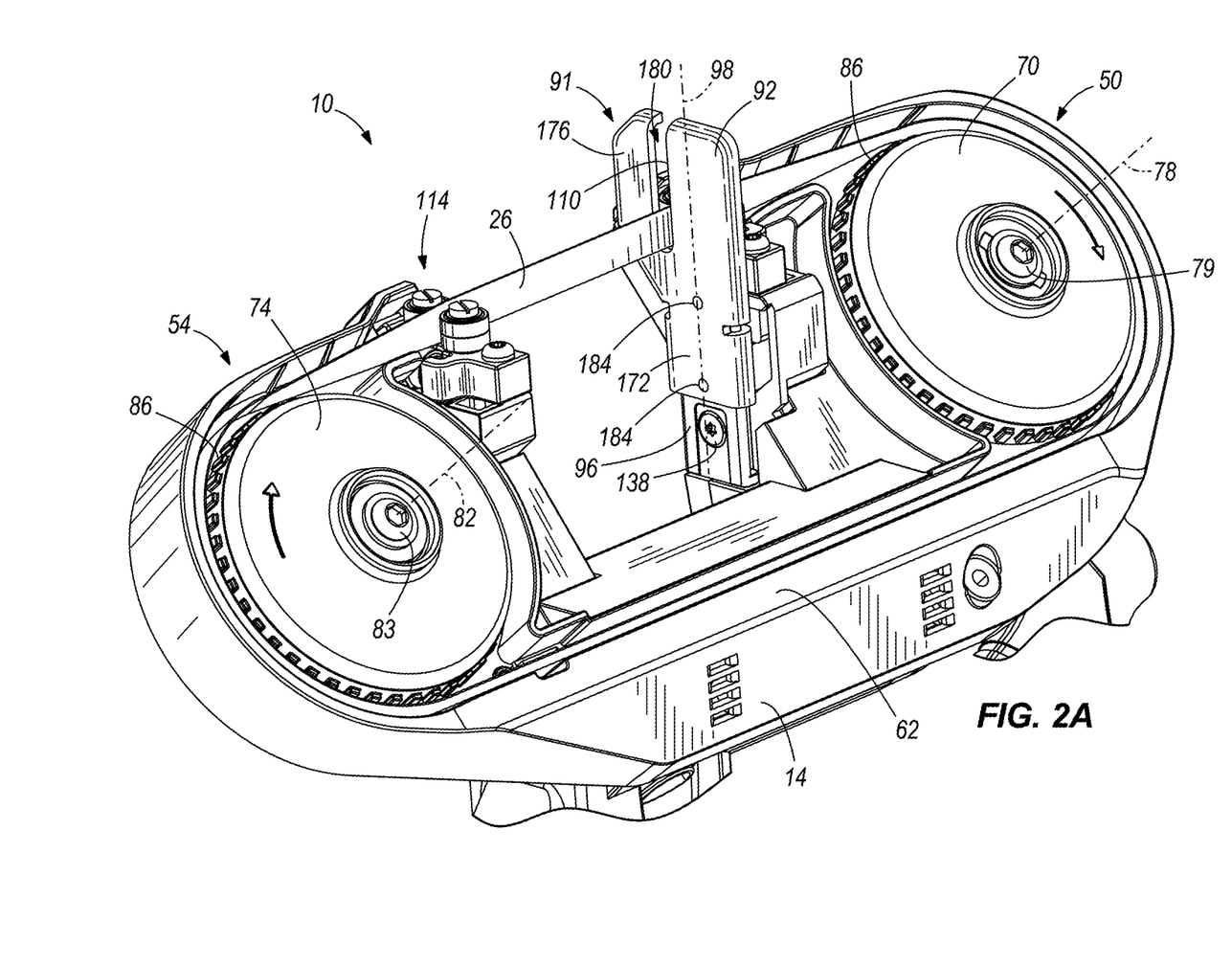
FIG. 2A is a bottom perspective view of the band saw of FIG. 1.

As shown in FIG. 2A, the drive mechanism generally includes a drive wheel pulley 70 and a driven wheel pulley 74. The drive wheel 70 rotates about a drive wheel axis 78 defined by a drive wheel axle 79 and is drivingly connected to the motor 18 via a drive train (not shown). The driven wheel 74 rotates about a driven wheel axis 82 defined by a driven wheel axle 83 and is rotatably supported by the housing 14. The drive wheel 70 is positioned in the first portion 50 of the housing 14, and the driven wheel 74 is positioned in the second portion 54 of the housing 14. A wheel tire 86 is coupled to each of the peripheries of the drive wheel 70 and the driven wheel 74. Each wheel tire 86 is a circular-shaped ring formed of a soft and/or flexible elastomeric material that is able to lock or adhere to the respective wheel 70, 74. The band saw blade 26 extends around the drive wheel 70 and the driven wheel 74 and grips the blade tires 86 and, as a result, motion from the drive wheel 70 is transmitted to the band saw blade 26 via the blade tires 86. The band saw 10 also includes a blade tensioning mechanism 90 to adjustably provide appropriate tension on the band saw blade 26.

A first guide roller set 110 and a second guide roller set 114 are disposed on each side of the cavity 66 and engage opposing sides of the saw blade 26. The first and second guide roller sets 110, 114 support the band saw blade 26 as the blade 26 enters and exits the cut zone 58.

The band saw 10 also includes an adjustable shoe system 91 including a shoe 92 for positioning against the workpiece, a connector block 96 for coupling the shoe 92 to the housing 14, and a detent mechanism 161 (FIGS. 5A and 5B) for holding the shoe 92 in select positions relative to the connector block 96. The shoe 92 is coupled to the housing 14 by way of the connector block 96 and the detent mechanism 161.

With reference to FIGS. 2A-7, the connector block 96 is a generally T-shaped member coupled to the housing 14 by fasteners 138. The connector block 96 is coupled to the first portion 50 of the housing 14 adjacent the drive wheel 70 and is positioned in or adjacent the cavity 66 at an end of the cut zone 58. The connector block 96 includes fastener apertures 142 through which the fasteners 138 are disposed to couple the connector block 96 to the housing 14. In the illustrated construction, two fastener apertures 142 (FIG. 5A) and two screws 138 (FIG. 5B) are employed. In other constructions, fewer or more fasteners and fastener apertures may be employed to couple the connector block 96 to the housing 14, or the connector block 96 may be integrally formed with the housing 14.

Figure 7:
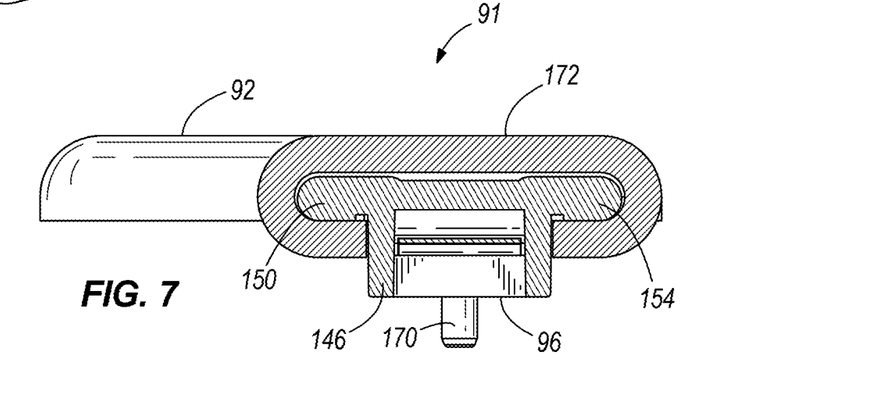
FIG. 7 is a cross section of the adjustable shoe system taken along line 7-7 of FIG. 6.

The connector block 96 includes a main body portion 146 and first and second extending portions or flanges 150, 154 generally forming a T-shape, as shown in FIG. 7. In the illustrated embodiment, the main body portion 146 is positioned adjacent the housing 14 and engages the housing 14 when the connector block 96 is fastened to the housing 14. The main body portion 146 includes first and second pins 170, 174 extending therefrom for locating the connector block 96 with respect to the housing 14. As illustrated in FIG. 5B, the pins 170, 174 are received by apertures or recesses in the housing 14. The first and second extending portions 150, 154 communicate with the shoe 92, as described below.

Figure 5A:
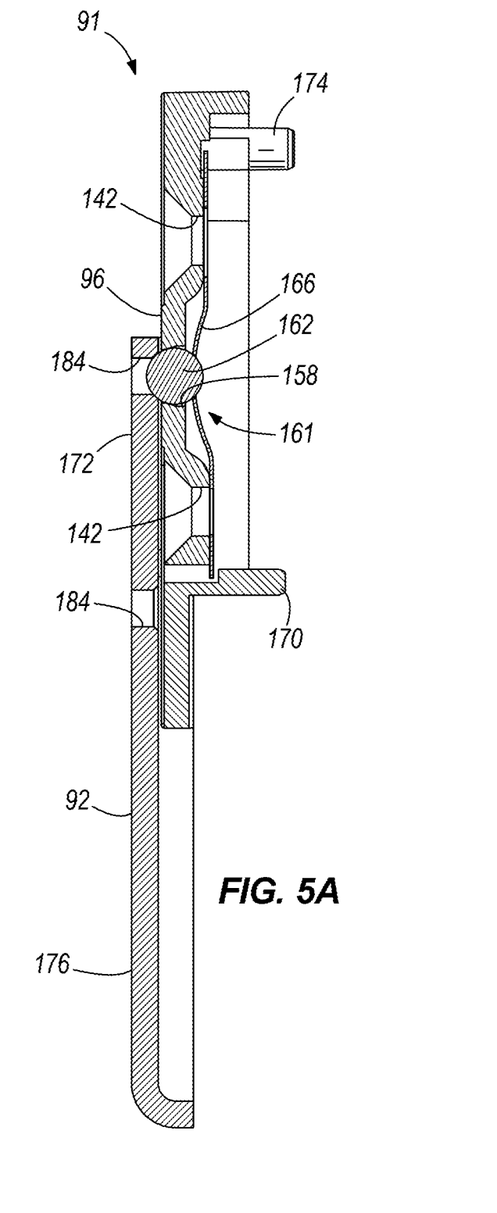
FIG. 5A is a cross section of the adjustable shoe system taken along line 5A-5A of FIG. 4.
Figure 5B:
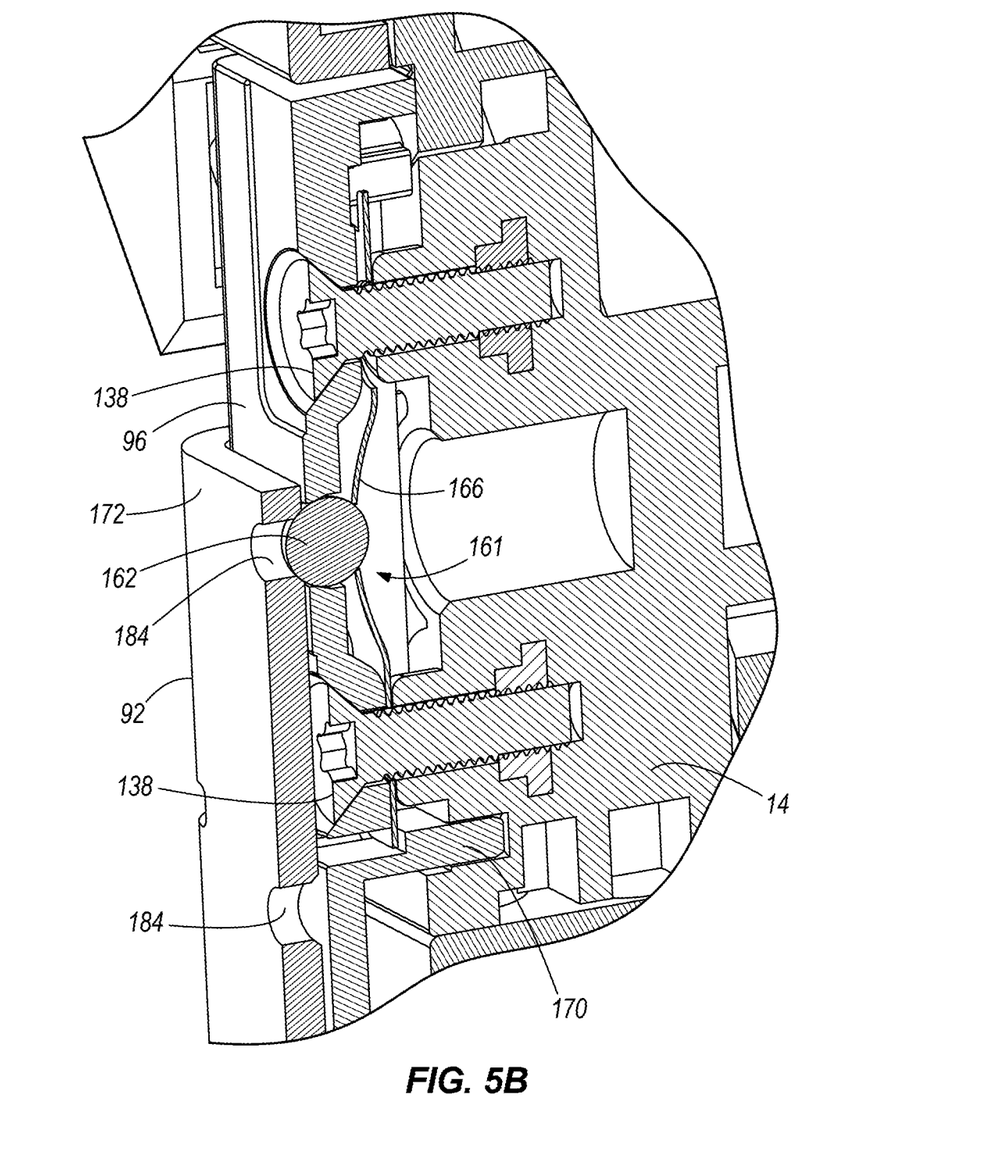
FIG. 5B is a cross section of a portion of the band saw taken along line 5B-5B of FIG. 2B.
Figure 6:
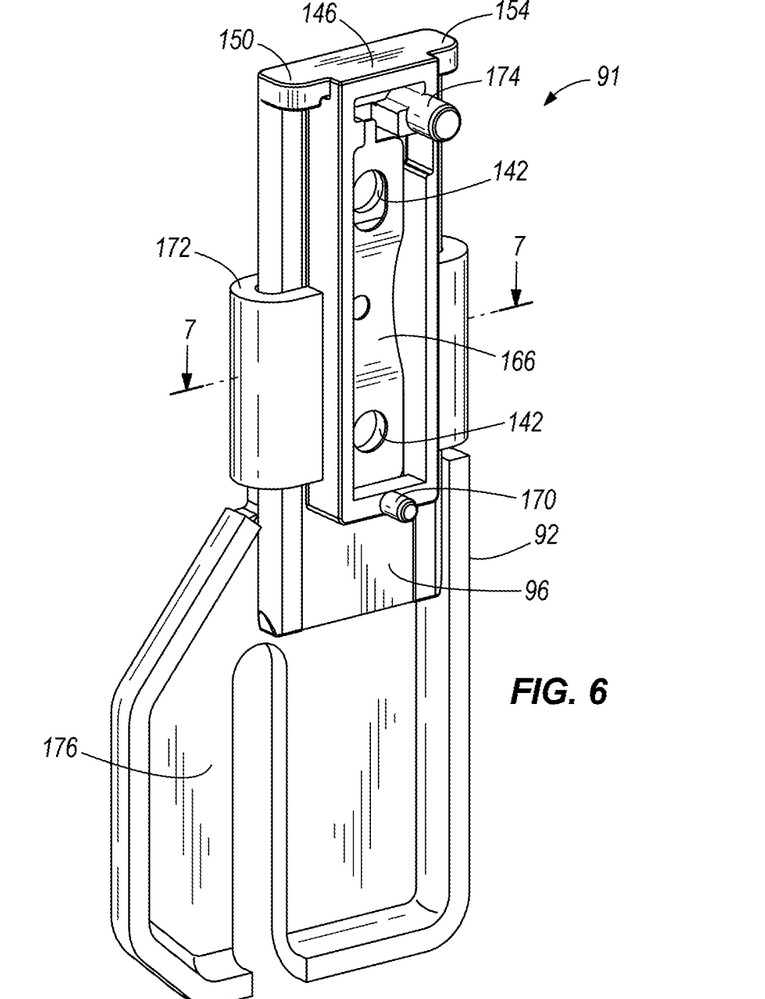
FIG. 6 is a rear perspective view of the adjustable shoe system of FIG. 1.

The connector block 96 also includes a recess or aperture 158 for receiving the detent mechanism 161 (FIGS. 5A and 5B). The detent mechanism 161 includes a ball detent 162 and a biasing member 166, such as a leaf spring. The ball detent 162 is biased by the biasing member 166 to an extended position away from the housing 14 for engaging the shoe 92 and holding the shoe 92 in position with respect to the housing 14. In other constructions, the biasing member 166 may include other types of springs and biasing members, such as a coil spring.

Figure 2B:
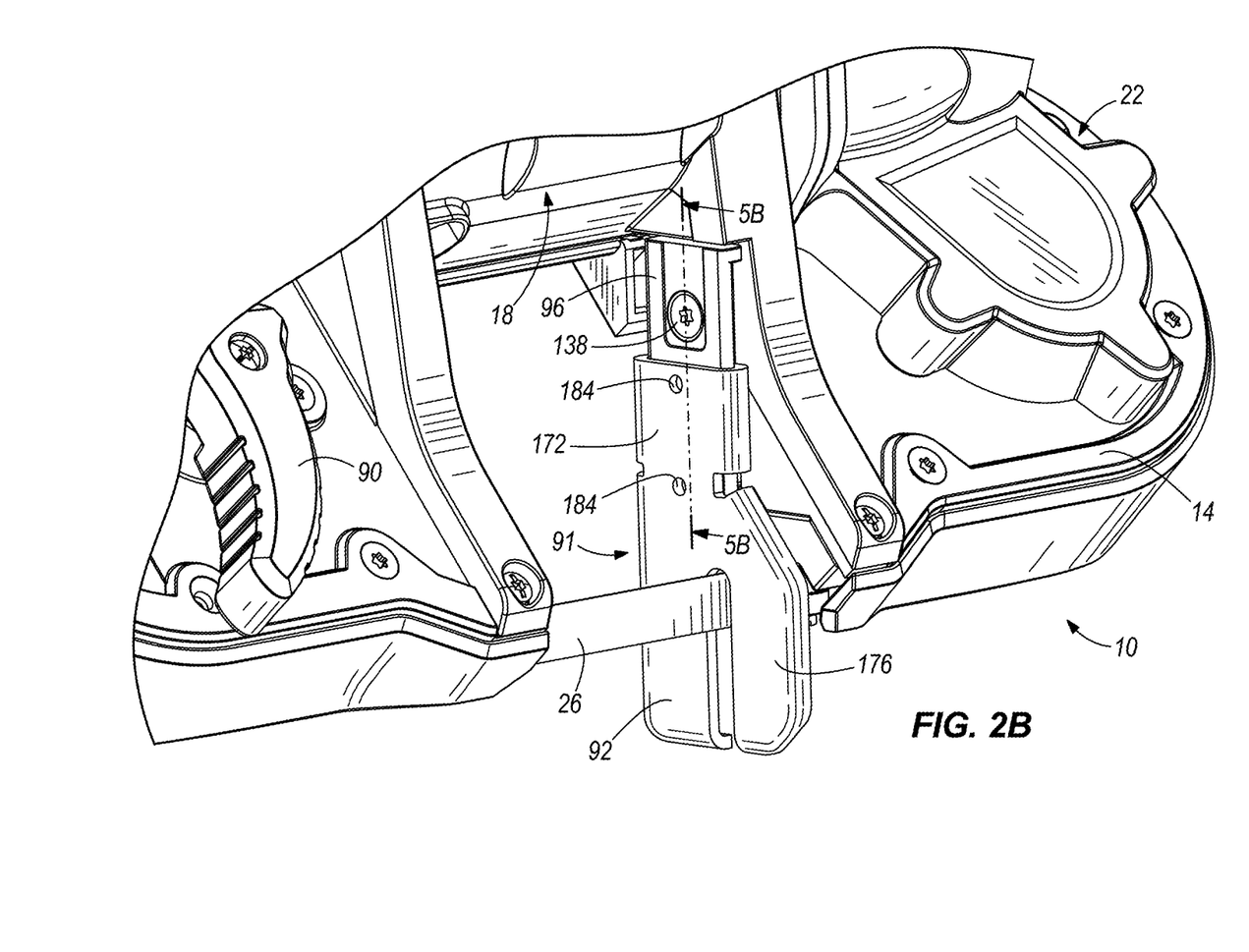
FIG. 2B is a top perspective view of a portion of the band saw shown in FIG. 1.
Figure 3:
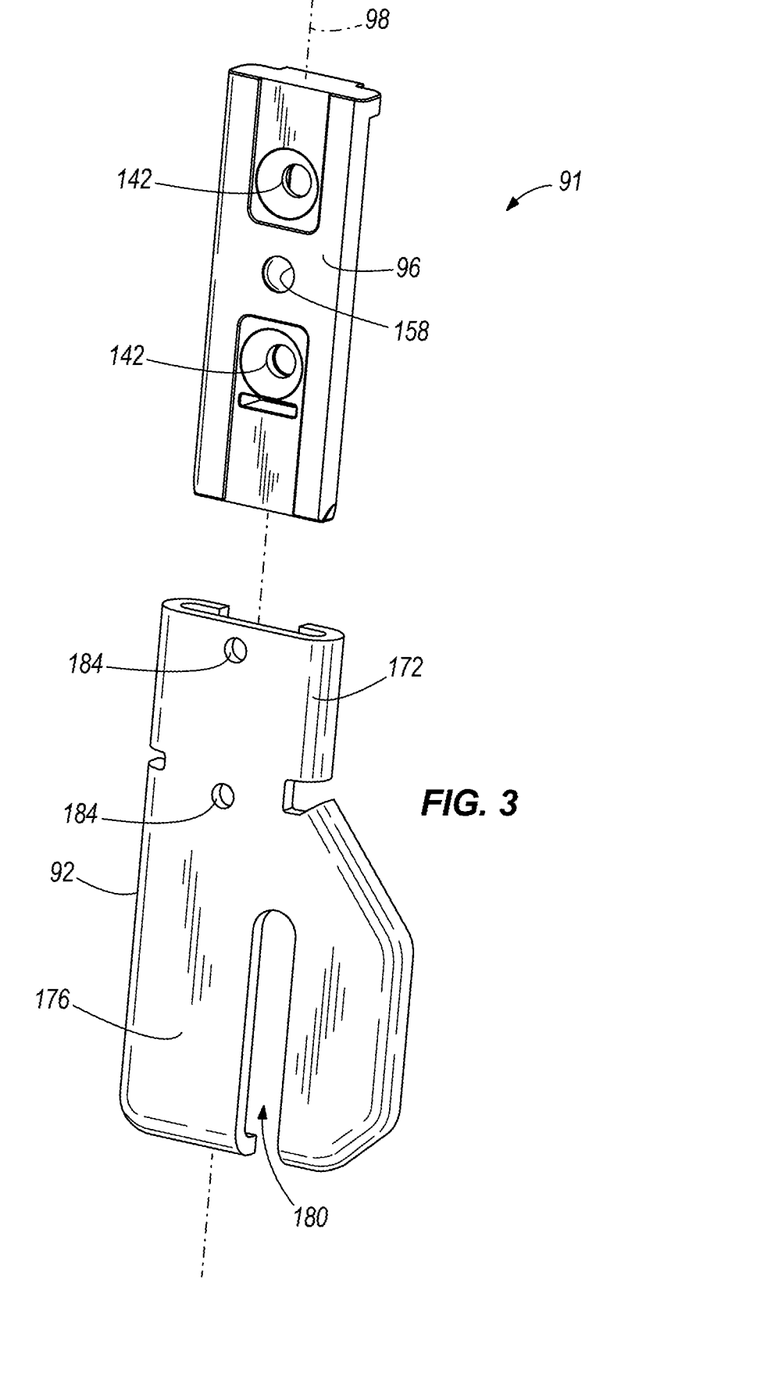
FIG. 3 is an exploded perspective view of the adjustable shoe system of FIG. 1.
Figure 4:
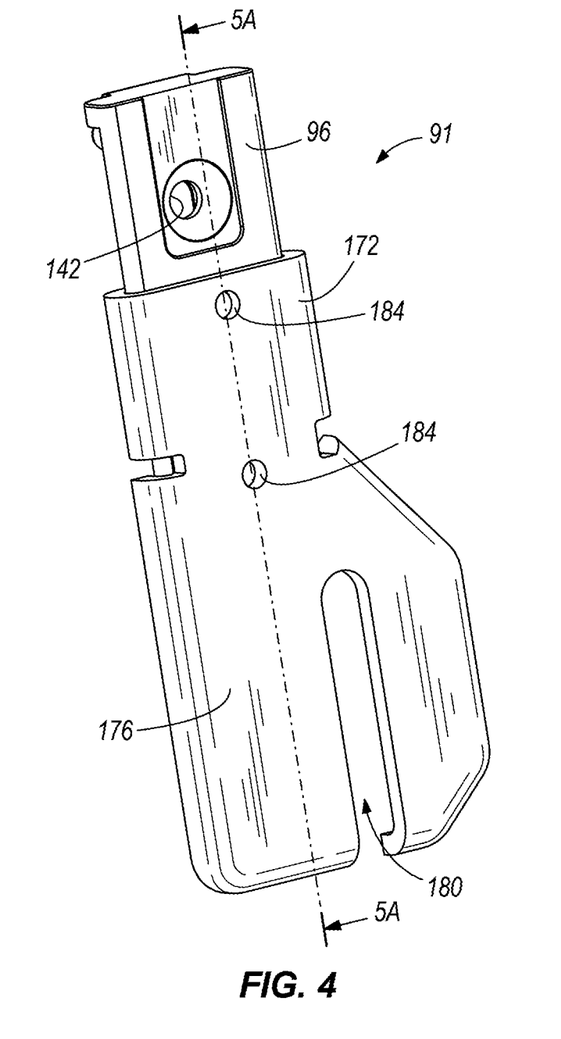
FIG. 4 is a perspective view of the adjustable shoe system of FIG. 1.

With further reference to FIGS. 3-7, the shoe 92 includes a generally C-shaped body member 172 and a workpiece-engaging member 176. The body member 172 wraps around and slideably engages the first and second extending portions 150, 154 of the connector block 96. An axis 98 of the adjustable shoe system 91 is defined by the direction the shoe 92 slides relative to the connector block 96. The axis 98 is also defined by an axis of symmetry of the body member 172. In the illustrated embodiment, the detent mechanism aperture 158 and the fastener apertures 184 are centered on the axis 98. The workpiece-engaging member 176 generally extends along the axis 98 below the cut zone 58 and away from the housing 14 of the band saw 10. The shoe 92, and in particular the workpiece-engaging member 176, engages a workpiece (not shown) in order to secure the workpiece relative to the band saw blade 26 within the cut zone 58 during a cutting operation. The workpiece-engaging member 176 includes a groove or slot 180 in which the band saw blade 26 is positioned, as shown in FIGS. 2A-2B. The direction of movement of the band saw blade 26 through the slot 180 is generally perpendicular to the axis 98, and a plane of the band saw blade 26 extending through the slot 180 is generally parallel to the axis 98.

Referring to FIGS. 2A-6, the shoe 92 includes apertures 184 for receiving the detent mechanism 161 and holding or locating the shoe 92 in position relative to the housing 14. The ball detent 162 is biased toward the shoe 92 and is received by one of the apertures 184 to engage the shoe 92 and hold the shoe 92 in a position corresponding to the respective aperture 184. In the construction of FIGS. 2A-7, the shoe 92 includes two apertures 184 and is adjustable between a first engaged position and a second engaged position. In the first position, the ball detent 162 is received by a first of the apertures 184 and engages the shoe 92 to hold the shoe 92 in the first position (FIGS. 2A, 2B, and 5A-6), i.e., to hold the shoe 92 with respect to the connector block 96. In the second position, the ball detent 162 is received by a second of the apertures 184 and engages the shoe 92 to hold the shoe 92 in the second position.

The first position is an extended position, extending away from the housing 14, for accommodating larger workpieces. The second position is a recessed position, recessed toward the housing 14, for accommodating smaller workpieces or cutting flush against a surface, such as a ceiling or wall. In the fully recessed position, the end of the shoe is adjacent or near a bottom edge (i.e., the cutting edge) of the band saw blade 26. A non-engaged position includes a position in between the first and second positions. In the non-engaged position, the ball detent 162 is not received by the apertures 184. The non-engaged position may also include a position in which the shoe 92 is removed from the connector block 96. In other constructions, three or more apertures 184 may be employed such that the shoe 92 is adjustable between three or more positions ranging from a fully extended to a fully recessed and intermediate positions therebetween for positioning and securing the band saw 10 with respect to a variety of workpieces of varying sizes and shapes.

Figure 8:
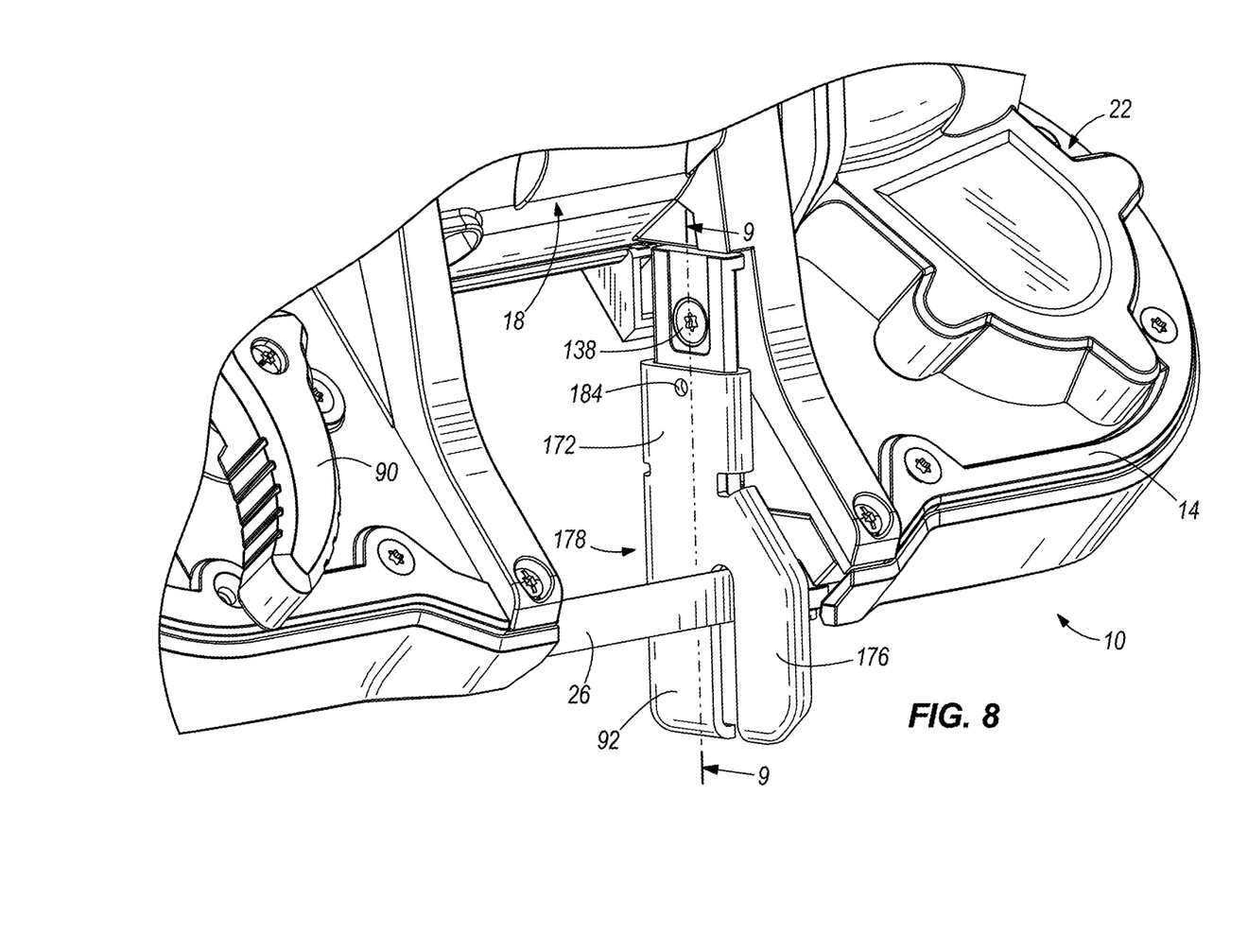
FIG. 8 is a top perspective view of a band saw including a removable shoe system according to another embodiment of the invention.
Figure 9:
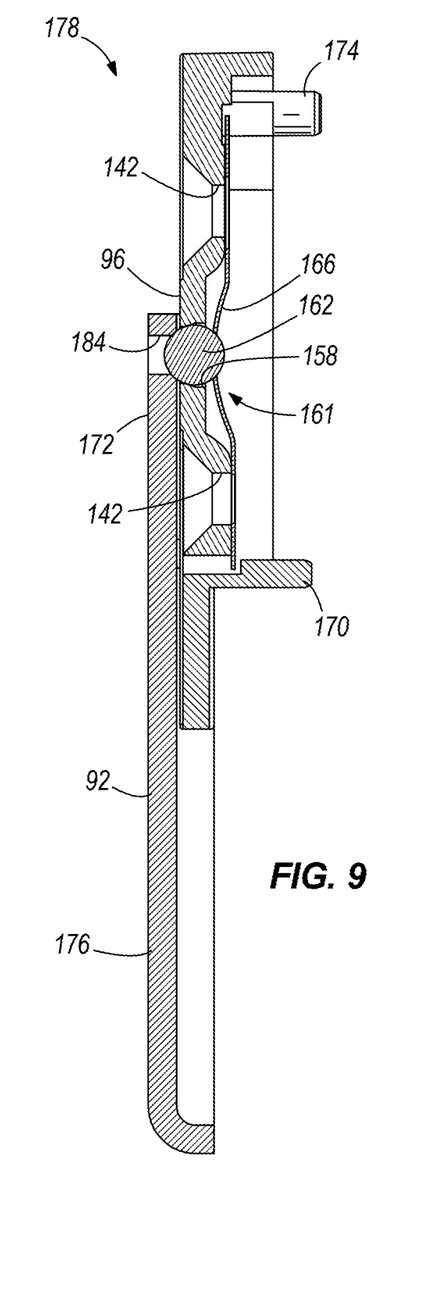
FIG. 9 is a cross section of the removable shoe system taken along line 9-9 of FIG. 8.

FIGS. 8-9 illustrate a removable shoe system 178, given the same reference numerals as the adjustable shoe system 91 shown in FIGS. 1-7. The removable shoe system 178 is similar to the adjustable shoe system 91 except that the shoe 92 includes only one aperture 184. In this construction, the shoe 92 is moveable between an engaged position in which the ball detent 162 is received by the aperture 184 and a non-engaged position in which the shoe 92 is removed from the connector block 96. The non-engaged position may also include an intermediate position in which the shoe 92 is not removed, but in which the ball detent 162 does not engage the aperture 184.

In order to adjust the position of the shoe 92, a user applies a force on the shoe 92 in the direction of the axis 98. The force causes the body of the shoe 92 to engage the ball detent 162 and overcome the biasing force of the biasing member 166. The ball detent 162 is moved toward the housing 14 and engages an inner surface of the shoe 92 as the shoe 92 is moved to another position or removed. When one of the apertures 184 is positioned adjacent the ball detent 162, the ball detent 162 is pushed at least partially into the one of the apertures 184 by the biasing spring force and engages the body of the shoe 92 surrounding the one of the apertures 184 to hold the shoe 92 in place. In operation, the shoe 92 is adjusted by applying a force on the shoe 92 in either direction along the axis 98 to move the shoe 92 to a desired position depending on the size and shape of the workpiece being cut, or to remove the shoe 92. No tools or removal of fasteners are required to adjust or remove the shoe 92.

Although particular constructions embodying independent aspects of the present invention have been shown and described, other alternative constructions will become apparent to those skilled in the art and are within the intended scope of the independent aspects of the present invention.

What is claimed is:

1. A shoe for a band saw, the shoe comprising:
    a body having a substantially planar surface for engaging a workpiece, and a plurality of apertures aligned linearly along the substantially planar surface, the body defining a generally C-shaped member having a generally C-shaped cross-section in a plane substantially perpendicular to the substantially planar surface, the generally C-shaped member defining in the plane a generally T-shaped receptacle for slidably receiving a correspondingly-shaped member; and
    a biased detent feature having a holding force with a magnitude sufficient to hold the body when the detent feature is seated in one of the plurality of apertures;
    wherein the generally C-shaped member includes a pair of rails extending substantially parallel to a direction of alignment of the plurality of apertures for constraining the movability of the body to a linear path;
    wherein the body is moveable linearly in the direction of alignment of the plurality of apertures between an engaged position in which the body is held with the holding force of the detent feature, and a non-engaged position in which the body is movable with respect to the detent feature; and
    wherein the body is moveable out of the engaged position in the direction by application of a disengaging force in the direction acting to move the body with respect to the detent feature and acting to overcome the holding force in the engaged position.

2. The shoe of claim 1, wherein the body is movable out of the engaged position when the biased detent feature is compressed by the application of the disengaging force.

3. The shoe of claim 1, wherein the body is not movable laterally with respect to the linear path.

4. The shoe of claim 1, wherein the body includes an open-ended slot through the substantially planar surface for receiving a band saw blade, wherein the open-ended slot is elongated substantially parallel to the direction of alignment of the plurality of apertures.

5. The shoe of claim 1, wherein the holding force of the detent feature is sufficient to hold the body against linear movement while a workpiece engages the substantially planar surface during a cutting operation of the band saw.

6. The shoe of claim 1, wherein the biased detent feature includes a ball biased by a biasing member toward the body.

7. A shoe for a band saw, the shoe comprising:
a body including a generally C-shaped member defined by a substantially planar portion for engaging a workpiece and a pair of rails extending transverse to the substantially planar portion and wrapping such that the body includes a generally T-shaped receptacle defined by the substantially planar portion and the pair of rails for slidably receiving a correspondingly-shaped member, wherein the substantially planar portion includes a plurality of apertures aligned linearly; and
a biased detent feature having a holding force with a magnitude sufficient to hold the body when the detent feature is seated in one of the plurality of apertures;
wherein the body is moveable linearly, relative to the detent feature, in the direction of alignment of the plurality of apertures between an engaged position in which the body is held with the holding force of the detent feature, and a non-engaged position in which the body is movable with respect to the detent feature; and
wherein the body is moveable out of the engaged position in the direction by application of a disengaging force in the direction acting to move the body with respect to the detent feature and acting to overcome the holding force in the engaged position.

8. The shoe of claim 7, wherein the holding force of the detent feature is sufficient to hold the body relative to the detent feature while a workpiece engages the substantially planar portion during a cutting operation of the band saw.

9. The shoe of claim 7, wherein the body is movable out of the engaged position when the biased detent feature is compressed by the application of the disengaging force.

10. The shoe of claim 7, wherein the body is not movable laterally with respect to the direction.

11. The shoe of claim 7, wherein the body includes an open-ended slot through the substantially planar portion for receiving a band saw blade, wherein the open-ended slot is elongated substantially parallel to the direction of alignment of the plurality of apertures.

12. The shoe of claim 7, wherein the biased detent feature includes a ball biased by a biasing member toward the body.

13. A shoe kit for a band saw, the shoe kit comprising:
a body including a generally C-shaped member defined by a substantially planar portion for engaging a workpiece and a pair of rails extending transverse to the substantially planar portion and wrapping such that the body includes a generally T-shaped receptacle defined by the substantially planar portion and the pair of rails of the generally C-shaped member, wherein the substantially planar portion includes at least one aperture;
a block configured to be coupled to the band saw, the block defining a generally T-shaped member correspondingly shaped with the generally T-shaped receptacle, wherein the body is configured to slide relative to the generally T-shaped member in a linear direction; and
a biased detent feature having a holding force with a magnitude sufficient to hold the body relative to the block when the detent feature is seated in the at least one aperture;
wherein the body is slideable in the linear direction with respect to the generally T-shaped member between an engaged position in which the body is held relative to the block with the holding force of the detent feature, and a non-engaged position in which the body is movable with respect to the block.

14. The shoe kit of claim 13, wherein the holding force of the detent feature is sufficient to hold the body relative to the block while a workpiece engages the substantially planar portion during a cutting operation of the band saw.

15. The shoe kit of claim 13, wherein the at least one aperture includes a plurality of apertures aligned linearly in the linear direction.

16. The shoe kit of claim 13, wherein the body is moveable out of the engaged position in the direction by application of a disengaging force in the direction acting to move the body with respect to the detent feature and acting to overcome the holding force in the engaged position.

17. The shoe kit of claim 13, wherein the block includes first and second flanges extending outwardly from a main body portion to define the generally T-shaped member.

18. The shoe kit of claim 17, wherein the substantially planar portion and the pair of rails wrap around from a first side of the first and second flanges to a second side of the first and second flanges for constraining the body to be slideable in the linear direction with respect to the block.

19. The shoe kit of claim 13, further comprising fasteners for coupling the block to the band saw.

20. The shoe kit of claim 13, wherein the biased detent feature includes a ball biased by a biasing member toward the body.

* * * * *